United States Patent
Borghi et al.

(10) Patent No.: US 11,351,927 B2
(45) Date of Patent: Jun. 7, 2022

(54) ARTICULATING CROSSBAR FOR A VEHICLE

(71) Applicant: Rivian IP Holdings, LLC, Plymouth, MI (US)

(72) Inventors: Cory Borghi, Wixom, MI (US); Eric Griffith, Farmington Hills, MI (US); Christian Elder, Sylvan Lake, MI (US)

(73) Assignee: Rivian IP Holdings, LLC, Irvine, CA (US)

(*) Notice: Subject to any disclaimer, the term of this patent is extended or adjusted under 35 U.S.C. 154(b) by 0 days.

(21) Appl. No.: 16/681,638

(22) Filed: Nov. 12, 2019

(65) Prior Publication Data

US 2020/0148127 A1 May 14, 2020

Related U.S. Application Data

(60) Provisional application No. 62/760,866, filed on Nov. 13, 2018.

(51) Int. Cl.
*B60R 9/052* (2006.01)
*B60R 9/058* (2006.01)

(52) U.S. Cl.
CPC .............. *B60R 9/052* (2013.01); *B60R 9/058* (2013.01)

(58) Field of Classification Search
CPC ................................ B60R 9/052; B60R 9/058
USPC ........................................................ 224/309
See application file for complete search history.

(56) References Cited

U.S. PATENT DOCUMENTS

| | | | | |
|---|---|---|---|---|
| 2,890,852 A | * | 6/1959 | Bradley | B60R 9/058 248/206.3 |
| 3,193,228 A | * | 7/1965 | Chion | B63B 17/04 256/69 |
| 3,215,323 A | * | 11/1965 | Bonitt | B60R 9/06 224/325 |
| 3,719,313 A | * | 3/1973 | Tischler | B60R 9/04 224/309 |
| 4,030,647 A | * | 6/1977 | Rasor | B60R 9/04 224/325 |
| 4,473,178 A | * | 9/1984 | Bott | B60R 9/045 224/321 |
| 5,340,007 A | * | 8/1994 | Jeuffray | B60R 9/045 224/315 |
| 5,377,890 A | * | 1/1995 | Brunner | B60R 9/045 224/309 |
| 5,395,024 A | * | 3/1995 | Luchtenberg | B60R 9/045 224/309 |
| 7,066,364 B2 | * | 6/2006 | Kmita | B60R 9/045 224/321 |
| 7,182,233 B1 | * | 2/2007 | Graffy | B60R 9/04 224/309 |

(Continued)

*Primary Examiner* — Peter N Helvey
(74) *Attorney, Agent, or Firm* — Haley Guiliano LLP

(57) ABSTRACT

A roof rack system is provided for affixing to a vehicle having a plurality of mounting locations. The roof rack system comprises a crossbar comprising a first end and a second end. The crossbar is configured to allow mounting of equipment. The roof rack system further comprises a first stanchion coupled to the first end of the crossbar by a first swivel joint. The roof rack system further comprises a second stanchion coupled to the second end of the crossbar by a second swivel joint. The first and second stanchions are configured to mount to respective mounting locations of the plurality of mounting locations.

21 Claims, 4 Drawing Sheets

(56) References Cited

U.S. PATENT DOCUMENTS

| | | | |
|---|---|---|---|
| 7,458,490 B2 * | 12/2008 | Klinkman | B60R 9/045 224/321 |
| 8,251,267 B2 * | 8/2012 | Aftanas | B60R 9/045 224/321 |
| 9,616,819 B2 * | 4/2017 | Kmita | B60R 9/058 |
| 10,207,649 B2 * | 2/2019 | Wymore | B60R 9/04 |
| 10,576,901 B2 * | 3/2020 | Aftanas | F16B 21/04 |
| 2003/0080168 A1 * | 5/2003 | Aftanas | B60R 9/045 224/321 |
| 2010/0084448 A1 * | 4/2010 | Fjelland | B60R 9/058 224/322 |
| 2018/0118127 A1 * | 5/2018 | Wymore | B60R 9/058 |

* cited by examiner

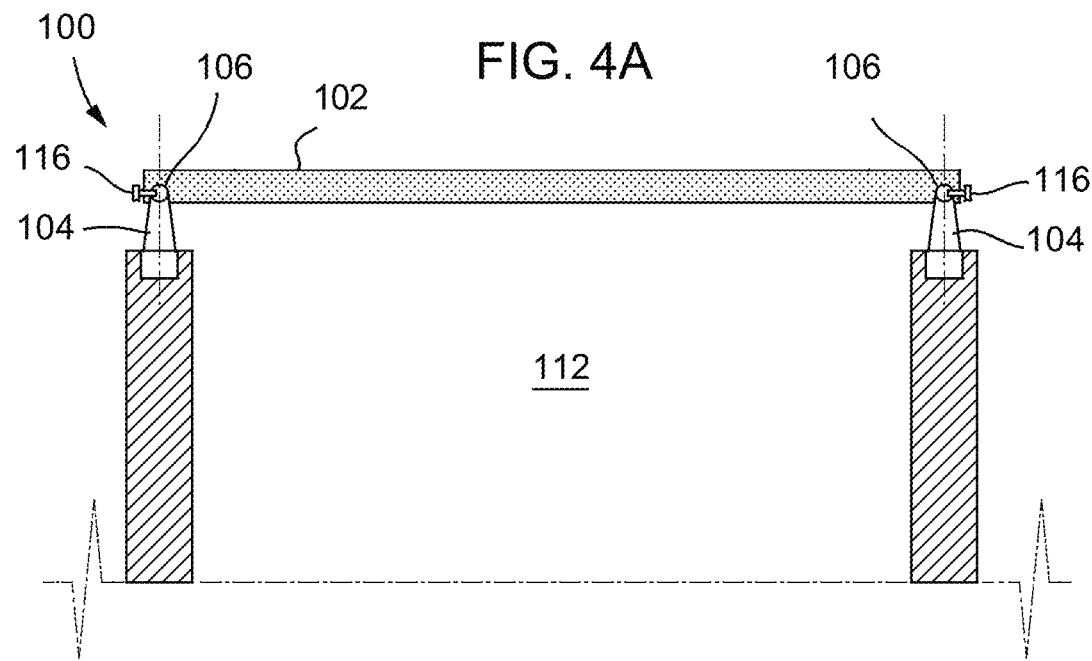
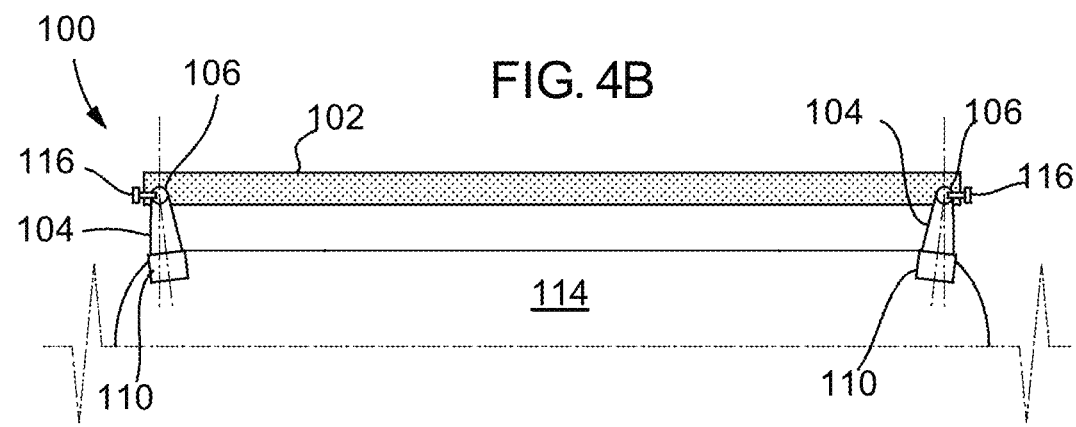
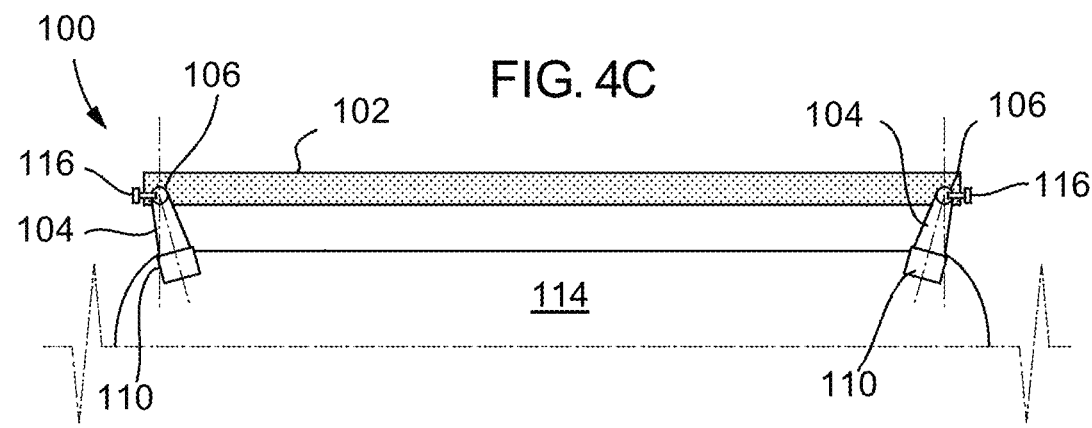

ARTICULATING CROSSBAR FOR A VEHICLE

CROSS REFERENCE TO RELATED APPLICATION

This disclosure claims the benefit of U.S. Provisional Application No. 62/760,866, filed Nov. 13, 2018, which is hereby incorporated by reference herein in its entirety.

INTRODUCTION

Current roof rack systems for vehicles typically allow adjustability only in the cross-vehicle direction. For example, this can be accomplished by lengthening or shorting the distance between the mounting feet to adjust to the body mounting features, which support and fasten the rack to the roof. However, this approach may require the mounting features in the body to be commonly placed, square to body grid, planar to ground, able to slide fore/aft on a rail system, or a combination thereof. In some circumstances, such constraints limit the versatility of a roof rack to only be used in specific locations (e.g., a crossbar can be a front crossbar or a rear crossbar). It would be advantageous for a roof rack system to be versatile such that it could be mounted at various locations.

SUMMARY

In some embodiments, a cargo rack system, e.g., a roof rack system, is provided for affixing to a vehicle having a plurality of mounting locations. The roof rack system comprises a crossbar comprising a first end and a second end. The crossbar is configured to allow mounting of equipment. The roof rack system further comprises a first support member, e.g., a first stanchion, coupled to (or near to) the first end of the crossbar by a first moveable coupling, e.g., a first swivel joint. The roof rack system may further comprise a second support member, e.g., a second stanchion, coupled to (or near to) the second end of the crossbar by a second moveable coupling, e.g., a second swivel joint. The first and second stanchions are configured to mount to respective mounting locations of the plurality of mounting locations.

In some embodiments, the plurality of mounting locations comprises a pair of mounting locations at a cargo bed of the vehicle. In some embodiments, the plurality of mounting locations comprises a pair of mounting locations at a roof of the vehicle. The respective mounting locations may comprise a forward location on a first side of the vehicle and a rearward location on a second side of the vehicle.

In some embodiments, the first swivel joint comprises a ball joint. The first swivel joint may be configured to allow the crossbar to rotate relative to the first stanchion about at least one rotational axis. The first swivel joint may be configured to allow the crossbar to rotate relative to the first stanchion about three rotational axes.

In some embodiments, the roof rack system further comprises a first locking mechanism configured to constrain the relative motion of the crossbar and the first stanchion. The locking mechanism may comprise a clamping mechanism configured to hold the swivel joint in an orientation by friction forces.

In some embodiments, the crossbar is configured to be adjustable in length. In some embodiments, the crossbar comprises a feature for mounting equipment.

In some embodiments, the first stanchion is configured to be mounted to the respective mounting location in a single orientation. In some embodiments, the first stanchion comprises a latching mechanism configured to engage with a feature of the respective mounting location.

In some embodiments, the plurality of mounting locations are regularly arranged in a grid relative to the vehicle. In some embodiments, the plurality of mounting locations are arranged in a non-grid relative to the vehicle. In some embodiments, each of the plurality of mounting locations comprises a respective orientation relative to the vehicle. For example, each respective orientation may be the same as each other respective orientation. As another example, each respective orientation may be different from each other respective orientation.

In some embodiments, a method for securing a roof rack system to a vehicle is provided. The roof rack system comprises a crossbar comprising a first end and a second end. The crossbar is configured to allow mounting of equipment. The roof rack system further comprises a first support member, e.g., a first stanchion, coupled to the first end of the crossbar by a first moveable coupling, e.g., a first swivel joint. The roof rack system further comprises a second support member, e.g., a second stanchion, coupled to the second end of the crossbar by a second moveable coupling, e.g., a second swivel joint. The method comprises affixing the first stanchion to a first mounting location of the vehicle. The method further comprises articulating the first swivel joint to achieve a first orientation. The method further comprises articulating the second swivel joint to achieve a second orientation. The method further comprises affixing the second stanchion to a second mounting location of the vehicle.

In some embodiments, affixing the second stanchion is performed after articulating the first swivel joint and after articulating the second swivel joint. In some embodiments, articulating the first swivel joint and articulating the second swivel joint are performed simultaneously.

In some embodiments, the method further comprises locking the first swivel joint. In some embodiments, the method further comprises locking the second swivel joint. In some embodiments, the method further comprises articulating the first swivel joint comprises achieving a target detent position.

It will be understood that the term roof rack or roof rack system, as used herein, is used to describe any type of cargo rack or cargo rack system, e.g., a vehicle cargo rack or vehicle cargo rack system. The term roof rack or roof rack system is not limited to a vehicle roof, and may be applied to a roof, a cargo bed, a hood, a load space, any other suitable exterior surface of a vehicle, any other suitable interior surface of a vehicle, or any combination thereof.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

FIG. 4A shows a cross section through an illustrative vehicle having a roof rack system mounted across a rear loadspace of the vehicle, in accordance with some embodiments of the present disclosure.

FIG. 4B shows a partial cross section through an illustrative vehicle having a roof rack system mounted across a roof of the vehicle, in accordance with some embodiments of the present disclosure.

FIG. 4C shows a partial cross section through an illustrative vehicle having a roof rack system mounted across a roof of the vehicle, in accordance with some embodiments of the present disclosure.

DESCRIPTION

The present disclosure is directed to vehicle mounting system that includes a roof rack configured to accommodate varying angles and rotations among specific fixed mounting locations on the vehicle. For example, a vehicle may include a plurality of mounting points, distributed around the vehicle exterior (e.g., the substantially upward facing surfaces). In some embodiments, the roof rack includes a swivel joint (e.g., a ball joint, a hinge) at each end. The swivel joint allows mounting feet to articulate (e.g., rotate) to a suitable latching position of the vehicle. The swivel joint allows for the roof rack to be mounted in various positions around the vehicle without having to restrict the mounting positions to be planar or inline (e.g., directly across from each other on the sides of the vehicle). A suitable mounting arrangement may be determined among the mounting locations. The swivel joint may be lockable in an angular position (e.g., for repeated installations with minimal setup).

In an illustrative example, a roof rack may include two stanchions coupled at respective ends of a crossbar. The stanchions may be mounted to any suitable location on the vehicle (e.g., at suitable mounting ports). The stanchions are coupled to the crossbar by swivel joints, such that angles about various axes of rotation of the crossbar relative to the vehicle may be achieved.

In some embodiments, the use of an articulating roof rack system may allow the system to be applied to multiple vehicles (e.g., having differing mounting location arrangements, or mounting location orientations).

Figure 1A:
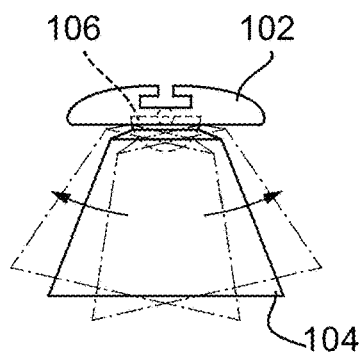
FIG. 1A shows a side view of an exemplary roof rack system, in accordance with some embodiments of the present disclosure.
Figure 1B:
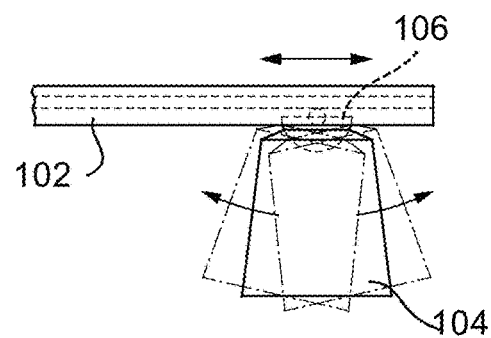
FIG. 1B shows a partial front view of an exemplary roof rack system, in accordance with some embodiments of the present disclosure.
Figure 1C:
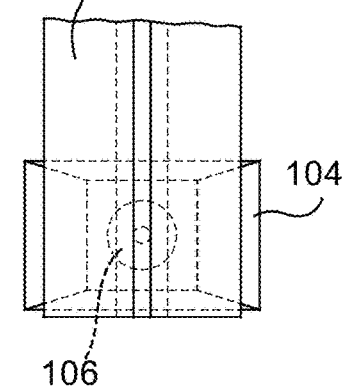
FIG. 1C shows a partial top view of an exemplary roof rack system, in accordance with some embodiments of the present disclosure.
Figure 1D:
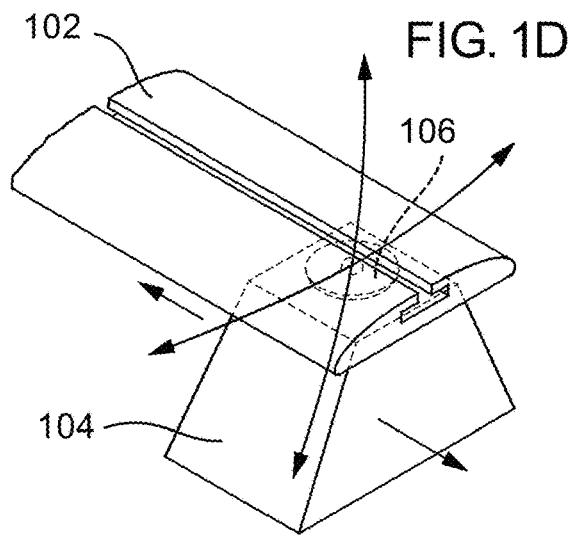
FIG. 1D shows a partial perspective view of an exemplary roof rack system, in accordance with some embodiments of the present disclosure.
Figure 1E:
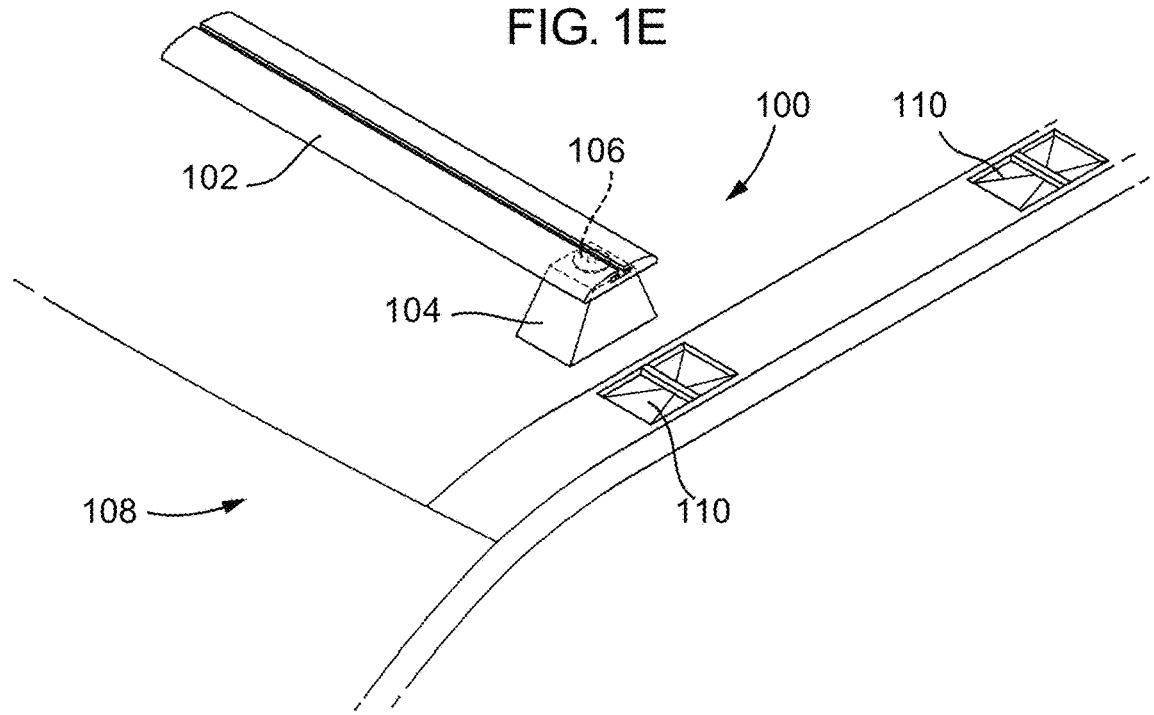
FIG. 1E a partial top perspective view of an exemplary roof rack system and an illustrative vehicle, in accordance with some embodiments of the present disclosure.

FIGS. 1A to 1E show several views of an illustrative roof rack system 100 having a crossbar 102 coupled to stanchions 104 by a swivel joint 106, in accordance with some embodiments of the present disclosure. FIG. 1E shows a partial top perspective of a vehicle 108, with two fixed mounting locations 110 (mounting ports) on the vehicle (e.g., along the roof line of one side of the vehicle). Because each of the swivel joints 106 allows rotation of the crossbar 102 relative to the stanchion 104, the crossbar 102 is not limited to be mounted across the front mounting ports, or the rear mounting ports, but also may be mounted to a front mounting port and a rear mounting port on the other side of the vehicle 108. In an illustrative example, the swivel joint 106 may include a ball joint, allowing the crossbar 102 to articulate among three rotational axes (e.g., orthogonal axes). The stanchions 104 mount to the vehicle 108 in a fixed orientation, but the crossbar 102 can achieve a range of angles relative to the stanchions 104, limited by the locations in which the stanchions 104 are mounted to the vehicle 108. In accordance with some embodiments of the present disclosure, the stanchions 104 may be moveably coupled, e.g., rotationally coupled, to the mounting locations 110 by virtue of the swivel joint 106 and/or one or more other rotational couplings. The crossbar 102 illustrated in FIGS. 1A to 1E is shown having an aerodynamic profile with a t-slot that is capable of receiving corresponding connectors that can be used for mounting objects to the crossbar. It will be understood that this is merely illustrative and crossbar 102 can be of any suitable shape and can use any suitable type of connecter, or in some embodiments no connector.

The use of a swivel joint 106 (e.g., a ball joint or a two-pivot mechanism) in each stanchion 104 of the roof rack, when having a fixed mounting location to the vehicle body, allows a crossbar 102 to be mounted in various configurations. For example, a given roof rack system 100 may be used for mounting in different mounting positions and mounting planes on the vehicle 108. This allows the stanchions 104 (e.g., the mounting anchors) to be positioned in such a way that they need not be arranged square or planar to a grid of mounting locations. Indeed, the stanchions 104 may be mounted on any appropriate surface of a vehicle, such as a sidewall of a loadspace of a vehicle, and at any appropriate angle.

In an illustrative example, a vehicle may include mounting locations 110 along the sides of a cargo bed 112 that are substantially parallel to the ground and mounting locations 110 along the roof line that lie at a slight angle to the ground. The swivel joints 106 allow the stanchions 104 to be mounted to the mounting locations 110 and the crossbar 102 to articulate relative to the stanchions 104 to accommodate the different mounting locations, e.g., the different angular orientations of the mounting locations 110 relative to the ground. Accordingly, a given crossbar 102 may be mounted to mounting locations 110 at the cargo bed 112 or roof 114. In a further example, the orientation of mounting locations along a vehicle's roof 114 may be different at different locations from front-to-back. Accordingly, a crossbar 102 may be mounted to either a front pair of mounting locations 110 or rear pair of mounting locations 110.

Figure 2A:
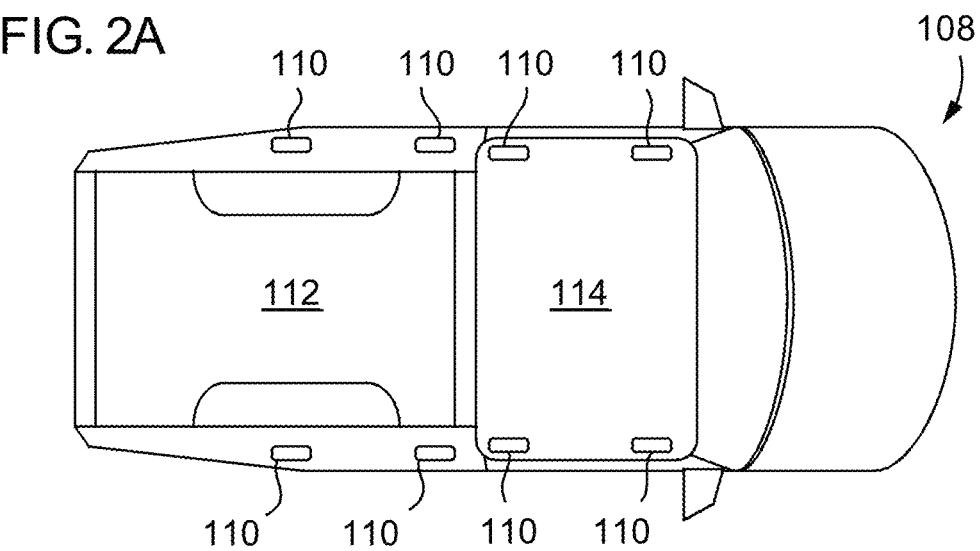
FIG. 2A shows a top view of an illustrative vehicle having mounting locations, in accordance with some embodiments of the present disclosure.
Figure 2B:
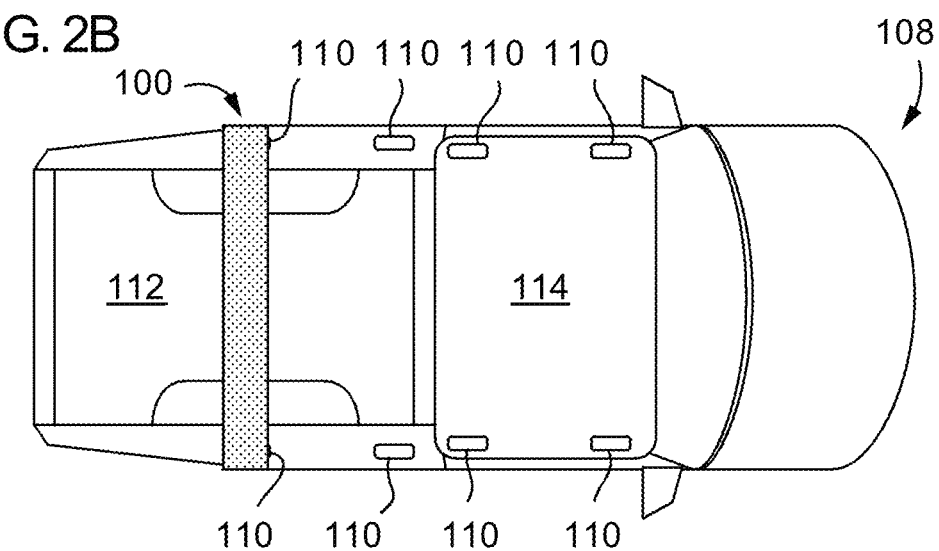
FIG. 2B shows a top view of an illustrative vehicle having mounting locations with a roof rack system mounted across a rear loadspace of the vehicle, in accordance with some embodiments of the present disclosure.
Figure 2C:
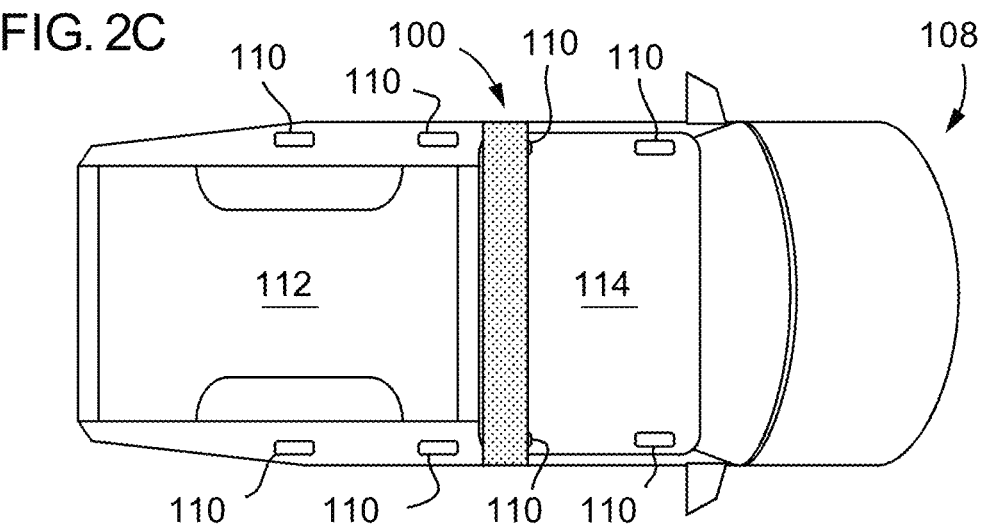
FIG. 2C shows a top view of an illustrative vehicle having mounting locations with a roof rack system mounted across a roof of the vehicle, in accordance with some embodiments of the present disclosure.

FIGS. 2A to 2C show three top views of an illustrative vehicle 108 having mounting locations 110, in accordance with some embodiments of the present disclosure. FIG. 2A shows the vehicle 108 without a roof rack system 100 installed. FIG. 2B shows the vehicle 108 with a roof rack system 100 mounted across a cargo bed 112 of the vehicle 108. FIG. 2C shows the vehicle 108 with the roof rack system 100 mounted at the rear of the roof 114 of the vehicle 108. In some embodiments, the stanchions 104 may be configured to move along the axis of the crossbar 102 in addition to rotation relative to the crossbar 102 (e.g., via a rail or other mechanism), to change the distance between the stanchions 104 (e.g., the distance between the selected mounting locations 110). In some embodiments, the crossbar 102 itself may be adjustable in length (e.g., telescoping construction, or sliding extendible components). For example, the side-to-side mounting locations at the cargo bed 112 may be, but need not be, a different distance apart than side-to-side mounting locations on the roof 114, which may themselves be different distances apart (e.g., rear and front need not be the same distance apart).

Figure 3A:
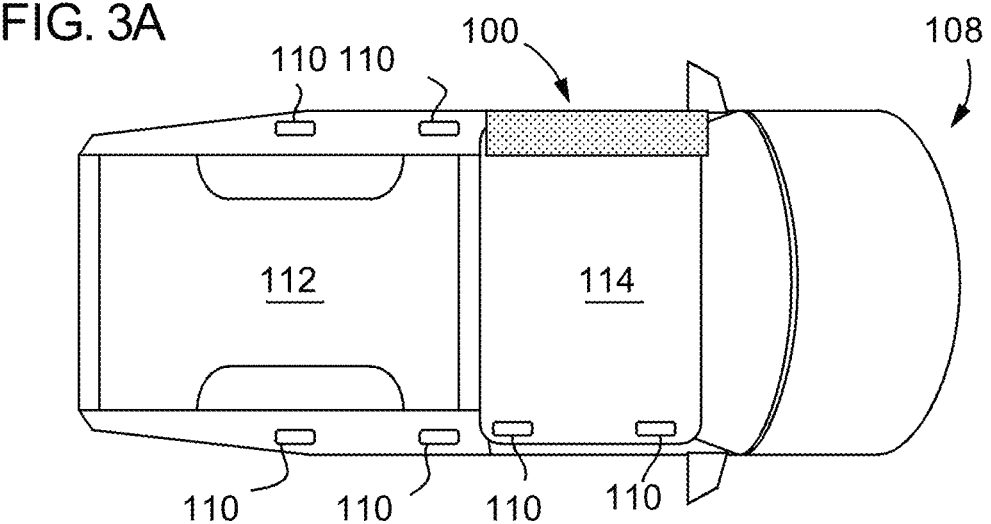
FIG. 3A shows a top view of an illustrative vehicle having mounting locations with a roof rack system mounted along a side of the roof of the vehicle, in accordance with some embodiments of the present disclosure.
Figure 3B:
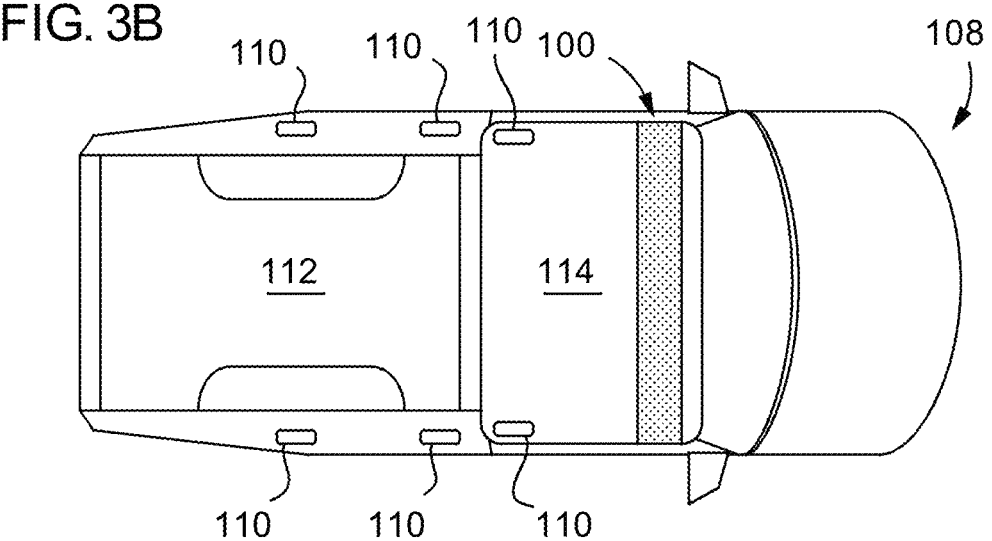
FIG. 3B shows a top view of an illustrative vehicle having mounting locations with a roof rack system mounted across a roof of the vehicle, in accordance with some embodiments of the present disclosure.
Figure 3C:
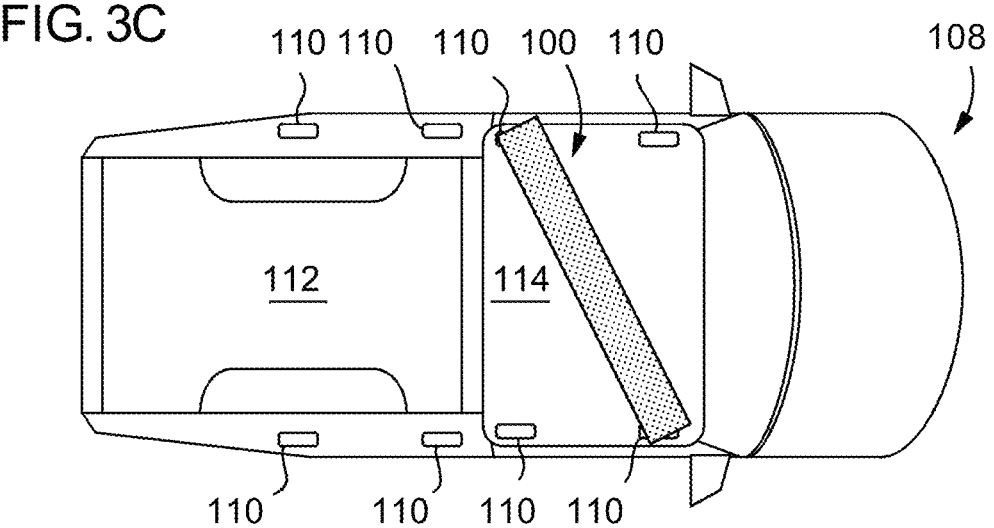
FIG. 3C shows a top view of an illustrative vehicle having mounting locations with a roof rack system mounted at a different angle relative to the vehicle than shown in view 3B, in accordance with some embodiments of the present disclosure.

FIGS. 3A to 3C show three top views of an illustrative vehicle 108 having mounting locations 110. FIG. 3A shows the vehicle 108 with a roof rack system 100 mounted along a side of the roof 114 of the vehicle 108, in accordance with some embodiments of the present disclosure. FIG. 3B shows the vehicle 108 with a roof rack system 100 mounted at the front of the roof 114 of the vehicle 108. FIG. 3C shows the vehicle 108 with the roof rack system 100 mounted at a different angle relative to the vehicle 108 than shown in FIG. 3B.

FIGS. 4A to 4C show three rearward cross section views of an illustrative vehicle 108 having a roof rack mounted at side-to-side mounting location pairs (e.g., at a cargo bed 112, rear of the roof 114, and front of the roof 114), in accordance with some embodiments of the present disclosure. The roof rack illustrated in FIGS. 4A to 4C includes a ball joint. FIG. 4A shows a roof rack mounted at the cargo bed, e.g., to the sidewall of the cargo bed 112, wherein the mounting locations 110 are parallel to the ground (e.g., the stanchion axis is substantially normal to the axis of the crossbar). FIG. 4B shows a roof rack mounted at the rear of the roof 114, wherein the mounting locations 110 are slightly angled relative to the ground (e.g., the stanchion axis is substantially off-normal to the axis of the crossbar 102). The respective ball joints allow sufficient articulation to accommodate the slight change in stanchion angle. FIG. 4C shows a roof rack mounted at the front of the roof 114, wherein the mounting locations 110 are more-than-slightly angled relative to the ground (e.g., the stanchion axis is off-normal to the axis of the crossbar). The respective ball joints allow sufficient articulation to accommodate the change in stanchion angle. Although the change in angle is relatively small as illustrated in FIGS. 4B and 4C, a swivel joint 106 may allow any suitable amount of rotational travel about suitable axes (e.g., from zero degrees to 360 degrees). Some axes of rotation may but need not support 360 degrees rotation. For example, a crossbar 102 may be able to articulate a full 360 degrees about a vertical axis but may be limited to 90 degrees of rotation about other axes. In a further example, the dimensions of the stanchion 104, crossbar 102, or both, may impact the angular range of motion.

A swivel joint 106 may include one or more degrees of freedom, in accordance with the present disclosure. A swivel joint 106 may allow any suitable range(s) of angular travel about any suitable axis or axes. In some embodiments, a swivel joint 106 may include a hinge, having a single rotational axis (e.g., one degree of freedom). For example, the single rotation axis may be directed front-to-back or side-to-side along the vehicle 108.

In some embodiments, the rotational motion may include a detent or otherwise be discretized. For example, a ball joint may include teeth, grooves, pins, holes, ridges, slots, blades, any other suitable feature for discretizing equilibrium orientations of the ball joint, or any combination thereof. In some embodiments, a swivel joint may include a locking mechanism 116, e.g., a latching mechanism configured to, when applied, constrain at least one degree of freedom (e.g., constrain rotation about a particular axis, or constrain all degrees of freedom). In some embodiments, a swivel joint 106 may include a discrete number of predetermined equilibrium orientations. For example, the predetermined equilibrium orientations may correspond to respective side-to-side mounting location pairs having respective mounting orientations. In some embodiments, a roof rack system 100 need not include a locking mechanism 116. For example, when two crossbars 102 are used and equipment (e.g., a storage bin, a kayak, auxiliary rack or other accessory) is secured across both crossbars, the equipment mounted to the crossbars 102 may sufficiently constrain motion (e.g., along with the stanchion mounting to the vehicle).

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A roof rack system for affixing to a vehicle having a plurality of mounting locations, the roof rack system comprising:
   a crossbar comprising a first end and a second end, the crossbar configured to allow mounting of equipment;
   a first stanchion coupled to the first end of the crossbar by a first ball joint having more than one degree of freedom; and
   a second stanchion coupled to the second end of the crossbar by a second ball joint having more than one degree of freedom; wherein:
      the first and second stanchions are configured to mount to respective mounting locations of the plurality of mounting locations.

2. The roof rack system of claim 1, wherein the plurality of mounting locations comprises:
   a pair of mounting locations at a cargo bed of the vehicle; and
   a pair of mounting location at a roof of the vehicle.

3. The roof rack system of claim 1, wherein the respective mounting locations comprise a forward location on a first side of the vehicle and a rearward location on a second side of the vehicle.

4. The roof rack system of claim 1, wherein the first stanchion is configured to move along an axis of the crossbar to change a distance between the first stanchion and the second stanchion.

5. The roof rack system of claim 4, wherein the first ball joint allows the crossbar to rotate relative to the first stanchion about three rotational axes.

6. The roof rack system of claim 1, further comprising a first locking mechanism configured to constrain the relative motion of the crossbar and the first stanchion.

7. The roof rack system of claim 6, wherein the locking mechanism comprises a clamping mechanism configured to hold the first ball joint in an orientation by friction forces.

8. The roof rack system of claim 1, wherein the crossbar is configured to be adjustable in length.

9. The roof rack system of claim 1, wherein the first stanchion is configured to be mounted to the respective mounting location in a single orientation.

10. The roof rack system of claim 1, wherein the crossbar comprises a feature for mounting equipment.

11. The roof rack system of claim 1, wherein the first stanchion comprises a latching mechanism configured to engage with a feature of the respective mounting location.

12. The roof rack system of claim 1, wherein the plurality of mounting locations are regularly arranged in a grid relative to the vehicle.

13. The roof rack system of claim 1, wherein the plurality of mounting locations are arranged in a non-grid relative to the vehicle.

14. The roof rack system of claim 1, wherein each of the plurality of mounting locations comprises a respective orientation relative to the vehicle.

15. The roof rack system of claim 14, wherein each respective orientation is the same as each other respective orientation.

16. The roof rack system of claim 14, wherein each respective orientation is different from each other respective orientation.

17. A method for securing the roof rack system of claim 1 to a vehicle, the method comprising:
  affixing the first stanchion to a first mounting location of the plurality of mounting locations of the vehicle;
  articulating the first ball joint to achieve a first orientation;
  articulating the second ball joint to achieve a second orientation; and
  affixing the second stanchion to a second mounting location of the plurality of mounting locations of the vehicle.

18. The method of claim 17, wherein affixing the second stanchion is performed after articulating the first ball joint and after articulating the second ball joint.

19. The method of claim 17, wherein articulating the first ball joint and articulating the second ball joint are performed simultaneously.

20. The method of claim 17, further comprising:
  locking the first ball joint; and
  locking the second ball joint.

21. The method of claim 17, wherein articulating the first ball joint comprises achieving a target detent position.

\* \* \* \* \*